United States Patent
Barrenscheen et al.

(10) Patent No.: US 9,098,393 B2
(45) Date of Patent: Aug. 4, 2015

(54) INTERFACE FOR ENSURING EFFICIENT DATA REQUESTS

(75) Inventors: Jens Barrenscheen, München (DE); Karl Herz, München (DE)

(73) Assignee: Infineon Technologies AG, Munich (DE)

(*) Notice: Subject to any disclaimer, the term of this patent is extended or adjusted under 35 U.S.C. 154(b) by 1034 days.

(21) Appl. No.: 10/116,490

(22) Filed: Apr. 4, 2002

(65) Prior Publication Data

US 2002/0147897 A1   Oct. 10, 2002

(30) Foreign Application Priority Data

Apr. 4, 2001   (DE) .................................. 101 16 863

(51) Int. Cl.

| G06F 12/00 | (2006.01) |
|---|---|
| G06F 12/02 | (2006.01) |
| G06F 12/06 | (2006.01) |
| G06F 12/08 | (2006.01) |
| G06F 3/06 | (2006.01) |
| G06F 13/16 | (2006.01) |

(52) U.S. Cl.
CPC .......... *G06F 12/0215* (2013.01); *G06F 3/0601* (2013.01); *G06F 3/0602* (2013.01); *G06F 3/0628* (2013.01); *G06F 3/0635* (2013.01); *G06F 12/00* (2013.01); *G06F 12/02* (2013.01); *G06F 12/063* (2013.01); *G06F 12/0862* (2013.01); *G06F 13/161* (2013.01); *G06F 2212/2022* (2013.01)

(58) Field of Classification Search
None
See application file for complete search history.

(56) References Cited

U.S. PATENT DOCUMENTS

| 4,292,674 | A |   | 9/1981  | Scheuneman |            |
|-----------|---|---|---------|------------|------------|
| 5,007,011 | A |   | 4/1991  | Murayama   |            |
| 5,553,261 | A |   | 9/1996  | Hasbun et al. |         |
| 6,145,069 | A | * | 11/2000 | Dye        | 711/170    |
| 6,209,058 | B1|   | 3/2001  | Shats et al. |          |
| 6,226,738 | B1| * | 5/2001  | Dowling    | 712/225    |
| 6,401,193 | B1| * | 6/2002  | Afsar et al. | 712/207  |
| 6,412,046 | B1| * | 6/2002  | Sharma et al. | 711/137 |
| 6,446,143 | B1| * | 9/2002  | Razdan et al. | 710/29  |
| 6,959,318 | B1| * | 10/2005 | Tso        | 709/203    |
| 2002/0087800 | A1| * | 7/2002 | Abdallah et al. | 711/137 |
| 2002/0188809 | A1| * | 12/2002 | Kershaw  | 711/133    |
| 2002/0199079 | A1| * | 12/2002 | Gonzales et al. | 711/219 |
| 2003/0154349 | A1| * | 8/2003  | Berg et al. | 711/137  |

OTHER PUBLICATIONS

Microsofy Dicitionary, 1999, Microsoft Press, Fourth Edition, pp. 17, and 64-65.*
IBM Technical Disclosure Bulletin: "High Performance Microprocessor Memory System", vol. 31, No. 3, Armonk, NY, USA, Aug. 31, 1988, XP-000028851, pp. 303-306.

* cited by examiner

*Primary Examiner* — Midys Rojas
(74) *Attorney, Agent, or Firm* — Laurence A. Greenberg; Werner H. Stemer; Ralph E. Locher

(57) ABSTRACT

The interface between a memory device and a device requesting data from the memory device ensures that the data requested are read from the memory device and forwarded to the device requesting the data. The interface described is distinguished by the fact that if, following the reading of data from the memory device, there are no further requests from the device requesting data, it modifies the address previously used to read data from the memory device and arranges for the data stored at the address in the memory device to be read, and/or in that, at a predefined time following the initiation of the read operation, it accepts the data output by the memory device and/or starts the next memory access.

50 Claims, 2 Drawing Sheets

INTERFACE FOR ENSURING EFFICIENT DATA REQUESTS

BACKGROUND OF THE INVENTION

Field of the Invention

The present invention relates to an interface between a memory device and a device requesting data from the memory device. The interface thereby ensures that the requested data are read from the memory device and forwarded to the device requesting the data.

The memory device to be read can be, for example, a conventional flash memory.

In the case of flash memories, there is generally a relatively long time before the data requested from them are output. The consequence of this is that it is normally necessary to operate with wait cycles (wait states). This, of course, is quite disadvantageous.

This problem occurs to a still more pronounced extent when the requested data are subjected to error correction before being output to the device requesting the data.

A configuration wherein this is the case is illustrated in FIG. 3.

The configuration illustrated in FIG. 3 forms a part of a microcontroller and contains a CPU 101 and a flash module 102, the flash module 102 having a wait state generator 103, a flash memory 104 and error correction logic 105.

The wait state generator 103 and the error correction logic 105 form an interface which ensures that the data requested by the CPU 101 is read from the flash memory 104 and forwarded to the CPU 101. The processes which proceed in this case will be described in more detail below.

The CPU 101 requests the data needed by it as required from the flash module 102, it being possible for this data to be code data, that is to say data representing commands to be executed, or data needed for command execution, such as operands or data, whose forwarding has been commanded by the CPU by means of a command that has just been executed.

The data is requested by the CPU 101 outputting to the flash module 102 an address ADR, which specifies the point at which the requested data is stored within the flash memory 104, and outputting a read request signal REQUEST. The address ADR is fed directly to the flash memory 104, and the read request signal REQUEST is fed to the wait state generator 103. When the wait state generator 103 receives the read request signal REQUEST, it produces a read signal READ and feeds this to the flash memory 104. In response to the receipt of the read signal READ, the flash memory 104 reads the data stored at the address ADR and outputs this data FLASH DATA to the error correction logic 105. The error correction logic 105 checks the data for freedom from error and corrects it as required; possible ways of error correction are known, so that it is possible to dispense with the description of further details relating to this. When the error correction logic 105 has completed the error correction, it signals this fact to the wait state generator 103, which then signals to the CPU 101, by means of a ready signal READY, that the data requested by the CPU is now available. The CPU then reads the data DATA output by the error correction logic 105. The processes described can then be repeated.

As a result of the fact that the action of reading data from the flash memory 104 lasts a relatively long time, and that the checking of the data for errors additionally requires a certain amount of time, it is a relatively long time until the CPU 101 receives the data requested by it. This is understandably a disadvantage.

SUMMARY OF THE INVENTION

It is accordingly an object of the invention to provide an interface, which overcomes the above-mentioned disadvantages of the heretofore-known devices and methods of this general type and which further reduces the time that elapses between the action of requesting data from a memory device and the receipt of these data.

With the foregoing and other objects in view there is provided, in accordance with the invention, an interface between a memory device and a device requesting data from the memory device, the interface ensuring that the requested data is read from the memory device and forwarded to the device requesting the data. The system is characterized in that if, following the reading of data from the memory device, there are no further requests from the device requesting data, the interface modifies the address previously used to read data from the memory device and arranges for the data stored at this address in the memory device to be read.

In accordance with an added feature of the invention, at a predefined time following the initiation of the read operation, the interface accepts the data output by the memory device.

In accordance with an additional feature of the invention, the time at which the interface accepts the data output from the memory device is defined independently of a signal via which the memory device signals the fact that the data to be output by it is ready to be fetched.

With the above and other objects in view there is also provided, in accordance with the invention, an interface between a memory device and a device requesting data from the memory device, the interface ensuring that the requested data is read from the memory device and forwarded to the device requesting the data, characterized in that, at a time defined in it following the initiation of the read operation, the interface accepts the data output by the memory device and/or starts the next memory access.

In accordance with another feature of the invention, the predefined time is defined independently of a signal via which the memory device signals the fact that the data to be output by it is ready to be fetched.

In accordance with a further feature of the invention, if, following the reading of data from the memory device, there are no further requests from the device requesting data, the interface modifies the address previously used to read data from the memory device and arranges for the data stored at this address in the memory device to be read.

In other words, the interface according to the invention is distinguished as follows:
  if, following the reading of data from the memory device, there are no further requests from the device requesting data, it modifies the address previously used to read data from the memory device and arranges for the data stored at this address in the memory device to be read; and/or
  at a time defined in it following the initiation of the read operation, it accepts the data output by the memory device and/or starts the next memory access.

The first-summarized interface makes it possible for the read access which has to be carried out to the memory device in order to read the data requested by the device requesting data from the memory device has already been started or has even already been carried out at the time the data is requested.

The second-summarized interface makes it possible for read accesses to the memory device not to last as long as is normally the case (without the claimed special feature).

These special features make it possible, both on their own and for the first time in combination with each other, for the time which elapses between the request for data by a device requesting data from a memory device, and the provision of this data, to be capable of considerable reduction in a very simple way and without changing the memory device.

In accordance with an added feature of the invention, the modified address is the address following the address last used.

In accordance with again an additional feature of the invention, the data output from the memory device is transferred into an intermediate storage device, and in that the intermediate storage device outputs the data stored in it directly or via further components of the interface to the device requesting data. The further components include an error correction logic, which subjects the data output from the memory device to error correction. Preferably, the further components include a further intermediate storage device connected downstream of the error correction logic.

In accordance with again another feature of the invention, the interface signals to the device requesting data, by means of a signal output to the latter, the fact that the data requested by it can be transferred.

When it receives a request from the device requesting data, the interface compares the address transmitted to it with the address last used to initiate access to the memory device. If the compared addresses agree, the interface outputs the data obtained in response to the last access to the memory device to the device requesting data. If the compared addresses do not agree, the interface reads the data stored at the received address from the memory device and outputs said data to the device requesting data. When the compared addresses do not agree and when an access to the memory device is currently being carried out, by means of which data not requested by the device requesting data is being read, the interface interrupts the reading of this data.

In accordance with again another preferred feature of the invention, an amount of data which is greater than the amount of data requested by the device requesting data is read from the memory device, and in that at least parts of the data output from the memory device are stored in a third intermediate storage device. Preferably, the interface outputs either the data output from the memory device or the data stored in the third intermediate storage device or parts of said data to the device requesting data. Alternatively, or in addition, the interface contains an address memory, in which in each case the address is stored which was used to read the data stored in the third intermediate storage device from the memory device. When it receives a request from the device requesting data, the interface compares the address transmitted to it with said request with the address stored in the address storage device. When the compared addresses agree, the interface outputs the data stored in the third intermediate storage device or part of said data to the device requesting data. When the compared addresses do not agree, the interface reads the data stored at the received address from the memory device and outputs said data to the device requesting data.

In accordance with yet an added feature of the invention, data stored in the third intermediate storage device are output to the device requesting data only when no data have been written to the memory device since the action of reading data stored in the third intermediate storage device from the memory device.

In accordance with yet an additional feature of the invention, only specific data are stored in the third intermediate storage device. By way of example, only data not representing commands are stored in the third intermediate storage device.

Alternatively, only data representing commands are stored in the third intermediate storage device.

In accordance with a concomitant feature of the invention, the interface is a constituent part of the memory device. In the alternative, the interface is a constituent part of the device requesting data.

Other features which are considered as characteristic for the invention are set forth in the appended claims.

Although the invention is illustrated and described herein as embodied in interface, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The aforementioned acceleration of the access to the memory device is made possible by an interface provided between the memory device and the device requesting data from the latter.

The interfaces described in more detail below accelerate the access by a CPU to a flash memory. It should be understood, however, that the interfaces described can also be used in another way; both the memory device and the device requesting data from this memory device can be independent of each other and also any other desired devices.

In the exemplary embodiments under consideration, the structures shown in the figures are a constituent part of a microcontroller. This, however, is non-limiting to the invention either. The configurations can also be a constituent part of another device, and the individual components of the arrangements can also be accommodated in various modules.

In the example under consideration, the data read out from the memory device are subjected to error correction before being output to the device requesting the data. There is no restriction to this either. By means of the special features described below of the arrangements considered, it is also possible to achieve advantages when no error correction is carried out.

Figure 1:
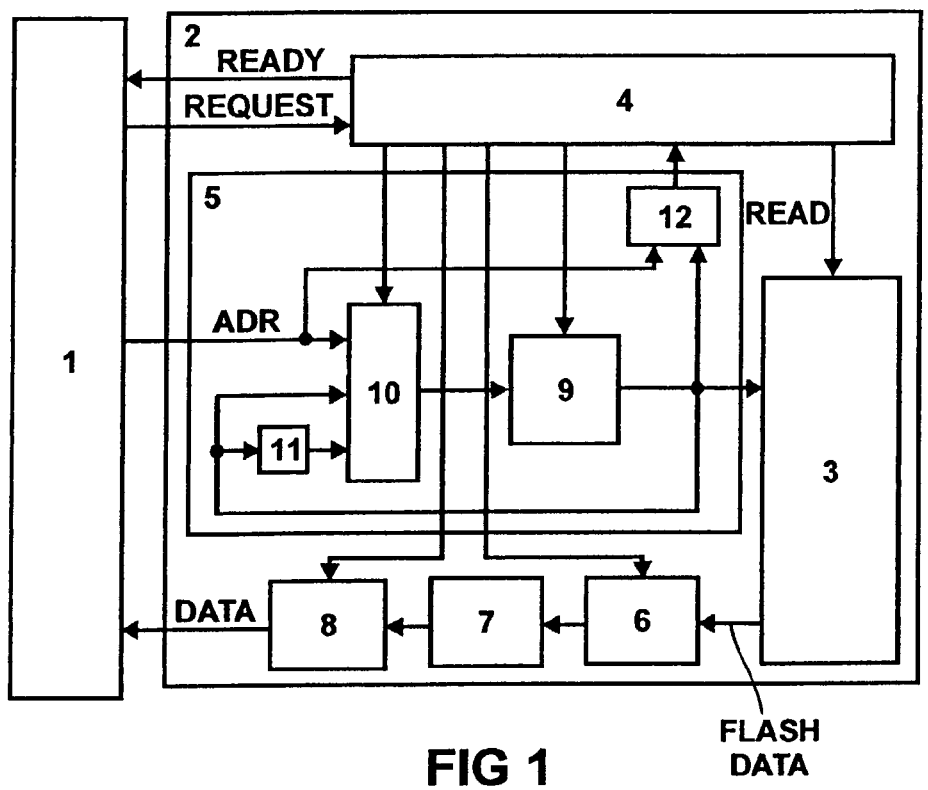
FIG. 1 is a block diagram illustrating a configuration with which a first possible way of accelerating the access to a memory device is implemented.

Referring now to the figures of the drawing in detail and first, particularly, to FIG. 1 thereof, there is shown a configuration by way of which a first possible way of accelerating access by the CPU to the flash memory is implemented.

The arrangement shown in FIG. 1 contains a CPU 1 and a flash module 2, the flash module 2 containing a flash memory 3, a control unit 4, an address unit 5, a first data register 6, error correction logic 7 and a second data register 8, and the address unit 5 containing an address register 9, a multiplexer 10, an incrementer 11 and a comparator 12.

The components 4 to 12 form the aforementioned interface between the CPU 1 and the flash memory 3.

Figure 3:
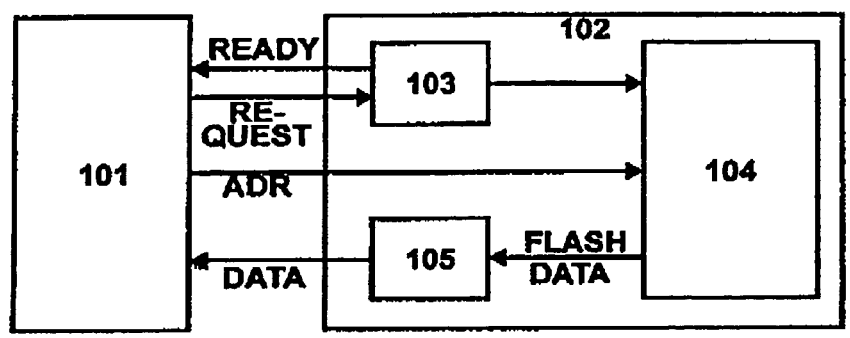
FIG. 3 is a conventional prior art configuration for accesses to a memory device.

The communication between the CPU 1 and the flash module 2 proceeds in the same way as in the arrangement shown in FIG. 3. This means that when the CPU 1 needs data from the flash memory 3, it outputs a read request signal REQUEST and an address ADR to the flash module 2, and the CPU 1 receives from the flash module 2 a ready signal READY and the data DATA requested by the CPU 1.

Here, however, the address ADR output by the CPU 1 is not fed to the flash memory 3 but to the multiplexer 10, which forwards this address or another address via the address register 9 to the flash memory 3.

The read request signal REQUEST is fed to the control unit 4, and the latter generates a read signal READ output to the flash memory 3.

In spite of the differences that are present, the flash module 2 can operate in the same way as the flash module 102 of the arrangement described at the beginning with reference to FIG. 3, that is to say the address ADR output by the CPU 1 can be fed to the flash memory 3 (via the multiplexer 10 and the address register 9), and the read request signal REQUEST output by the CPU 1 can be taken as a stimulus to generate a read signal READ and to feed it to the flash memory 3, whereupon the flash memory 3 reads the data stored at the address ADR and outputs it via the first data register 6 to the error correction logic 7, and the latter subjects the data fed to it to error checking and error correction and outputs it via the second data register 8 to the CPU 1, which reads is this data in following the receipt of the ready signal READY.

The data FLASH DATA output by the flash memory 3 is transferred into the first data register 6 as soon as the data to be read from the flash memory 3 is ready to be fetched; the corresponding time is predefined to the first data register 6 by the control unit 4 via a control line.

At substantially the same time, the data output by the error correction logic 7 is transferred into the second data register 8; this process is also controlled by the control unit 4 via an appropriate control line.

Likewise exactly or approximately at this time, a ready signal READY is output to the CPU 1 by the control unit 4, whereupon said CPU 1 accepts the data stored and output by the second data register 8.

The time at which the transfer of data into the first data register 6 and into the second data register 8, and the output of the ready signal READY, take place can be defined as a function of a ready signal which is output by the flash memory 3 when the data read from it and output is ready to be fetched. In the example considered, this time is defined in another way, however. In the present case, the length of time, for example how many clock periods, from the application of the read signal READ until the data to be read from the flash memory 3 can be accepted, is set in the control unit 4. Then, in each case after the expiry of this time, the control unit 4 arranges for the data output from the flash memory 3 to be transferred into the first data register 6, and the actions to be executed at the same time. As a result, monitoring the occurrence of a ready signal output by the flash memory 3 is unnecessary. This has the positive effect that the data output by the flash memory 3 can be accepted at an earlier time than would be the case if the transfer time were to be made dependent on the occurrence of the ready signal.

In addition, the control unit 4 ensures that, at substantially the same time as a read operation is concluded, the next reading operation is begun at the same time. A new address and a further read signal READ are preferably applied to the flash memory 3 as early as at the time at which the data output by the flash memory 3 are transferred into the first data register 6.

Which address this newly applied address is depends on whether the CPU 1 has output a new read request in the meantime (a new address ADR and a further read request signal REQUEST).

If this is the case, this new address ADR is fed to the flash memory 3. During the reading of the data stored at this address, the processes described above are repeated.

In the address unit 5, precautions are taken by means of which it is ensured that the address fed to the flash memory 3 does not change as long as the action of reading the data stored at this address has not been completed.

In the example considered, this is done by the address fed to the flash memory 3 (output by the address register 9) being fed to a second input terminal of the multiplexer 10, and by the multiplexer 10 switching through the address present on its second input terminal as soon as the address output by the address register 9 is the address to be applied to the flash memory at the relevant time.

If, at the time at which a new read operation can be started, there is no read request from the CPU 1 that has yet to be processed, the flash module 2 initiates the action of reading data from the flash memory 3 automatically, that is to say without an appropriate request from the CPU 1.

In this case, the flash memory 3 is fed with an address generated by the flash module 2, more precisely by the address unit 5, and a further read signal READ, as a result of which the flash memory 3 reads and outputs the data stored at the new address.

The new address used in the example considered is the address which follows the address last used. This is based on the finding that it is very often the case that the CPU 1 needs data stored at successive addresses. This applies in particular, but not exclusively, when the data to be read represents the commands belonging to the program to be executed by the CPU 1. It should already be pointed out at this point that the new address does not have to be the following address of the address last used. The new address can also be any other desired address; however, it is preferably an address whose reading the CPU 1 would most probably arrange by means of the next read request.

In the example considered, the generation of the new address by the address unit 5 is carried out by using the incrementer 11 and the multiplexer 10. The incrementer 11 increments the address just fed to the flash memory 3 (output by the address register 9) and feeds it to a third input terminal of the multiplexer 10.

The application of a new address to the flash memory 3 is then carried out in such a way that when the flash memory is to be fed with a new address, the multiplexer 10 initially switches through the address present on its third input terminal, that is to say the address incremented by the incrementer 11, to the address register 9 and, when the new address has been transferred into the address register 9 and output to the flash memory 3, switches through the address present on the second input terminal of the multiplexer 10, that is to say the address just output to the flash memory 3 from the address register 9.

The times at which the multiplexer 10 changes over and at which the address register 9 accepts the addresses fed to it are determined by the control unit 4 via corresponding control lines.

The action of reading the data which are stored at the address fed to the flash memory 3 is then carried out in exactly the same way as if the flash memory 3 were to be fed with an address ADR output by the CPU 1. In particular, the control unit 4 also ensures in this case that, after the time set in the control unit, the data output from the flash memory 3 is transferred into the first data register 6, the data output from the error correction logic 7 is transferred into the second data register 8 and the ready signal READY is output to the CPU 1.

If, in the meantime, still no read request from the CPU 1 has occurred, the flash module 2 remains at rest and waits for the next data request from the CPU 1.

If, during the access to the flash memory 3 initiated automatically by the flash module 2, a data request is made by the CPU 1, the address ADR output by the CPU 1 is compared by the comparator 12 with the address output by the address register 9, and the result of the comparison is output to the control unit 4.

If the control unit 4 receives a signal that the addresses compared with each other are the same, no access is made to the flash memory 3 in order to read the data requested by the read request from the CPU 1. The agreement between the addresses shows that the data requested is currently being read or has already been read.

If the requested data is currently being read, the control unit 3 ensures that the read operation is ended properly, and the data output from the flash memory 3, as described above, is output to the CPU 1 via the first data register 6, the error correction logic 7 and the second data register 8.

If the data requested has already been read and transferred into the first data register 6, this data can be transferred into the second data register 8 and output to the CPU 1 immediately (if, since the transfer of the data into the first data register 6, so much time has elapsed that the error correction could have been carried out) or shortly thereafter (after the time which is required in order to complete the error correction started).

In both cases, the CPU 1 receives the requested data more quickly than would be the case if the action of reading the requested data from the flash memory 3 were to be started only after the data request from the CPU 1.

If the address comparison carried out by the comparator 12 results in the addresses not agreeing, then the data which is being read or has been read as arranged on its own by the flash module 2 is not the data requested by the CPU 1. The control unit 4 ignores this data or interrupts the access to the flash memory 3 currently being executed and starts an access to the flash memory by means of which the data requested by the CPU 1 is read from the flash memory 3.

Although, in this case, it is possible to achieve provision of the data requested by the CPU 1 which is accelerated to a slight extent, in the case of the arrangement illustrated in FIG. 1, the time which elapses following a request for data from the CPU 1 until the requested data is fed to the latter is on average considerably shorter than is the case in the conventional arrangement according to FIG. 3.

A further possible way of shortening the time which elapses between the request for data from the CPU and the supply of this data to the CPU is that, during an access to the flash memory, a quantity of data is read which is greater than the quantity of data requested by the CPU, and that during successive requests for data by the CPU, the data already read is output to the CPU if possible, that is to say if the requested data is located among the data previously read.

Figure 2:
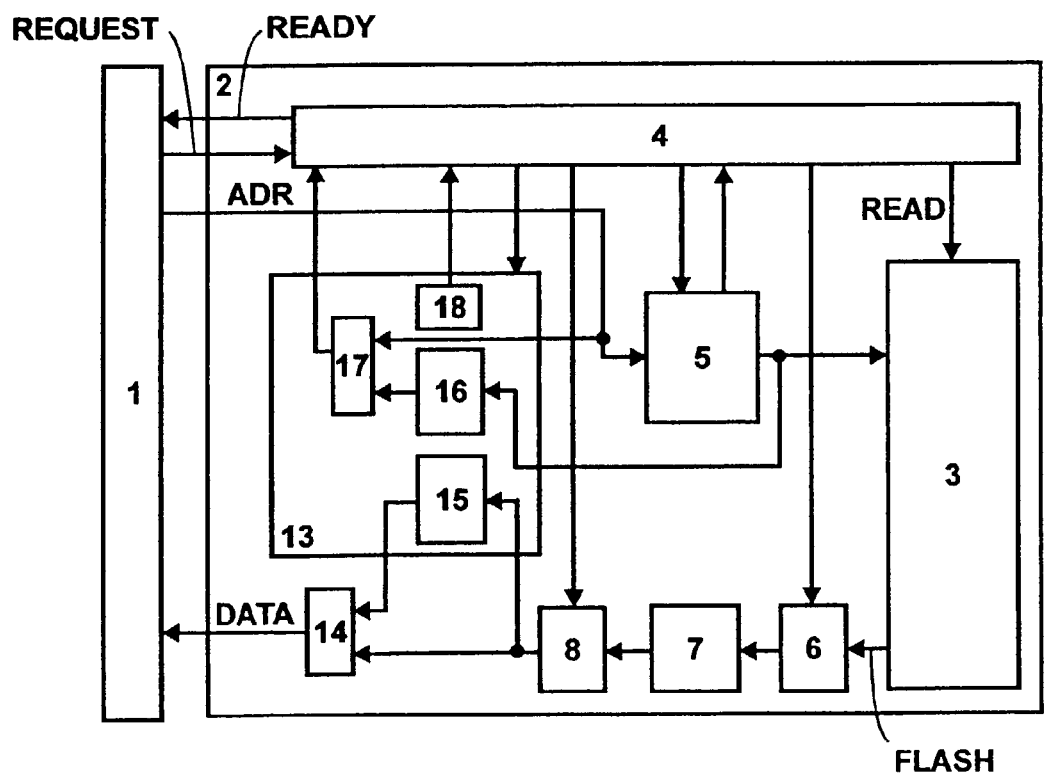
FIG. 2 is a block diagram illustrating a configuration with which the first possible way and in addition a second possible way of accelerating the access to a memory device is implemented.

An arrangement which is capable of doing this is illustrated in FIG. 2 and will be described below with reference to that figure.

In the system of FIG. 2, the first possibility of accelerating access described with reference to FIG. 1, and the second possible way of accelerating access, described below, are combined. However, it should already be pointed out at this point that the second possible way can also be used without the first possible way, and also proves to be advantageous without the first possible way.

To a large extent, the arrangement shown in FIG. 2 agrees with the arrangement shown in FIG. 1; the components designated by the same designations are the same or mutually corresponding components and will not be described again in the following text, in order to avoid repetition.

In addition to the components shown in the arrangement according to FIG. 1, the arrangement shown in FIG. 2 additionally has an intermediate data storage unit 13 and a second multiplexer 14, the intermediate data storage unit 13 containing a third data register 15, a second address register 16, a second comparator 17 and a validity flag 18.

In the example considered, the intermediate data storage device 13 is used "only" when the data requested by the CPU 1 is not data representing commands; for data representing commands, the accesses to the flash memory 3 are carried out in the same way as described previously with reference to FIG. 1.

In the example considered, this distinction is possible since the request for data representing commands and the request for data not representing commands are carried out via at least partly different terminals of the CPU 1. However, it is of course possible for any other desired measures which permit the detection of the type of data concerned in the case of the requested data.

It should be pointed out that there is no absolute necessity for the requests for data representing commands and data not representing commands to be treated differently. If the intermediate data storage unit 13 is to be used both for requests for data representing commands and for data not representing commands, it may prove to be advantageous to provide two intermediate data storage units 13, one intermediate data storage unit being reserved for data representing commands and the other intermediate data storage unit being reserved for data not representing commands. On the other hand, however, provision could also be made for the intermediate data storage unit 13 to be used exclusively for data representing commands.

The provision of an intermediate data storage unit 13 is expedient only if the quantity of data which is read from the flash memory 3 in one read operation is greater than the quantity of data which is forwarded to the CPU 1. In the example considered, it is the case that the data is read out from the flash memory 3 in units of 64 bits but—at least when data not representing commands is requested—only 16 bits per data request are output to the CPU 1.

If the CPU 1 requests data which does not represent commands, the address ADR output by the CPU 1 (via the address unit 5), and a read signal READ generated by the control unit 4 are applied to the flash memory 3.

The flash memory 3 then reads the data stored at the address fed to it and comprising 64 bits in the example considered and outputs said data to the first data register 6. The data is corrected as required by the error correction logic 7 and forwarded to the second data register 8. Of the 64 bits which are then stored in the second data register 8, those 16 bits which the CPU 1 has requested are output to the CPU 1 via the second multiplexer 14. Furthermore, at least the bits not output to the CPU 1, but preferably all 64 bits, are transferred into the third data register 15. In addition, the address at which the data under discussion was stored in the flash memory 3 is stored in the second address register 16.

If the CPU 1 immediately or subsequently again requests data not representing commands, a check is made by the second comparator 17 to see whether the address ADR output by the CPU 1 with the data request agrees with the address stored in the second address register 16.

If the addresses agree, the data requested by the CPU 1 is stored in the third data register 15. In this case, the control unit 4 arranges for the data requested by the CPU 1 to be output to the CPU 1 from the third data register 15, via the multiplexer 14, and interrupts the renewed reading of this data from the flash memory 3, which may already have been started, or ignores the data read from the flash memory 3 again.

If the addresses compared by the second comparator 17 do not agree, the data requested by the CPU 1 is read from the flash memory 3 by means of an appropriate access to the latter. In order not to lose any time, the access to the flash memory 3 is preferably started even before the comparison result has been determined.

Whether data stored in the third data register 15 is output to the CPU 1 in response to a data request from the CPU 1 additionally also depends on the content of the validity flag 18. When data is written to the third data register 15, the validity flag 18 is set to a specific value and maintains this value until data is written to the flash memory 3. When data is written to the flash memory 3, the content of the validity flag 18 is changed. The output of data stored in the third data register 15 is carried out only when the validity flag 18 has its initial value. This makes it possible to prevent data being output from the flash module 2 which might no longer correspond with the current flash memory content.

It should be obvious and require no further explanation that, as a result of outputting data stored in the third data register 15 to the CPU 1, it is possible to react considerably more quickly to data requests from the CPU 1 than would be the case if the respectively requested data always had to be read currently from the flash memory 3.

In particular when the CPU 1 currently does not need any data representing commands from the flash memory 3, provision can be made that, as soon as data not representing commands has been read from the flash memory 3, the next item of data is read out (as was described with reference to FIG. 1 for data representing commands). This next item of data can also already be subjected to error correction and then stored temporarily in the second data register 8 until it is needed.

As a result, relatively large amounts of data can be read even more quickly.

Data prefetches of this type are preferably not always carried out automatically but only after being enabled appropriately by the CPU 1. This means that, in the normal case, prefetches are carried out "only" for data representing commands, and only in exceptional cases for data not representing commands. Of course, this can also be precisely the reverse.

The interfaces described make it possible, irrespective of the details of the practical implementation, for the time which elapses between the request for data by a device requesting data from a memory device, and the provision of this data, to be reduced considerably in a very simple way and without changing the memory device itself.

We claim:

1. An interface between a flash memory device and a device requesting data from the memory device, the interface ensuring that data are read from the memory device and forwarded to the device requesting the data, the interface comprising:

a first connection to the device requesting data for receiving data requests;

a second connection to the memory device containing the data in memory locations each defined by an address;

the interface configured to:

at substantially the same time that all data requested by a data request issued by the device requesting data is provided to the device requesting data, perform a determination to see whether a further data request has been received over the first connection from the device requesting data, initiate a process to provide further requested data in response to the further data request if the determination indicates that the further data request has been received, and modify a previously requested address, which was previously used to read data from the memory device, and initiate reading the data stored at the modified address in the memory device only if the determination indicates that the further data request had not been received, the modified address originating in, and generated by, the interface.

2. The interface according to claim 1, wherein, at a predefined time following the initiation of the read operation, the interface accepts the data output by the memory device.

3. The interface according to claim 2, wherein the time at which the interface accepts the data output from the memory device is defined independently of a signal via which the memory device signals the fact that the data to be output thereby is ready to be fetched.

4. The interface according to claim 1, wherein the modified address is the address following the address last used.

5. The interface according to claim 1, which comprises an intermediate storage device connected to receive the data output from the memory device, said intermediate storage device outputting the data stored therein directly to the device requesting data.

6. The interface according to claim 1, wherein said interface comprises an intermediate storage device connected to receive the data output from the memory device, and further components, said intermediate storage device outputting the data stored therein via said further components of said interface.

7. The interface according to claim 6, wherein said further components include error correction logic subjecting the data output from the memory device to error correction.

8. The interface according to claim 7, wherein said further components include a further intermediate storage device connected downstream of said error correction logic in a signal flow direction.

9. The interface according to claim 1, wherein said interface is configured to output a signal to the device requesting data, the signal indicating that the data requested by the device can be transferred.

10. The interface according to claim 1, wherein said interface, upon receiving a request from the device requesting data, compares an address transmitted to said interface with an address with which the last access to the memory device was initiated.

11. The interface according to claim 10, wherein, when the compared addresses agree, said interface outputting the data obtained in response to a last access to the memory device to the device requesting data.

12. The interface according to claim 10, wherein, when the compared addresses do not agree, said interface reading the data stored at the received address from the memory device and outputting the data to the device requesting data.

13. The interface according to claim 12, wherein, when the compared addresses do not agree and an access to the memory device is currently being carried out, reading data not requested by the device requesting data, said interface interrupting the reading of the data.

14. The interface according to claim 1, which comprises a third intermediate storage device, and wherein an amount of data that is greater than an amount of data requested by the device requesting data is read from the memory device, and at least parts of the data output from the memory device are stored in said third intermediate storage device.

15. The interface according to claim 14, wherein said interface is configured to selectively output the data output from the memory device or the data stored in said third intermediate storage device or parts of the data to the device requesting data.

16. The interface according to claim 14, wherein said interface includes an address storage device for storing in each case the address that was used to read the data stored in said third intermediate storage device from the memory device.

17. The interface according to claim 16, wherein, upon receiving a request from the device requesting data, said interface compares the address transmitted with the request with the address stored in said address storage device.

18. The interface according to claim 17, wherein, when the compared addresses agree, said interface outputting a part or all of the data stored in said third intermediate storage device to the device requesting data.

19. The interface according to claim 17, wherein, when the compared addresses do not agree, said interface reading the data stored at the received address from the memory device and outputting the data to the device requesting data.

20. The interface according to claim 14, wherein said interface is configured to output data stored in said third intermediate storage device to the device requesting data only when no data have been written to the memory device since a last reading of data stored in said third intermediate storage device.

21. The interface according to claim 14, wherein said third intermediate storage device is configured to only store specific data.

22. The interface according to claim 21, wherein said third intermediate storage device is configured to store only data not representing commands.

23. The interface according to claim 21, wherein said third intermediate storage device is configured to store only data representing commands.

24. The interface according to claim 1, wherein said interface is a constituent part of the memory device.

25. The interface according to claim 1, wherein said interface is a constituent part of the device requesting data.

26. An interface configuration between a non-volatile memory device having data stored therein in memory locations each defined by an address and a device requesting data from the memory device, comprising:
an interface connected between the non-volatile memory device and the device requesting data from the memory device and configured to ensure that the requested data are read from the memory device and forwarded to the device requesting the data, said interface including a control unit;
said control unit having a predefined length of time preprogrammed therein, wherein said control unit causes said interface to accept the data being output by the memory device in response to said read operation at an expiration of said predefined length of time after an initiation of a read operation to obtain the data from the memory device.

27. The interface configuration according to claim 26, wherein the predefined time is defined independently of a signal with which the memory device signals the fact that the data to be output is ready to be fetched.

28. The interface configuration according to claim 26, wherein if, following the reading of data from the memory device, no further requests from the device requesting data are present, said interface modifies an address previously used to read data from the memory device and arranges for the data stored at that address in the memory device to be read.

29. The interface configuration according to claim 26, wherein the modified address is the address following the address last used.

30. The interface configuration according to claim 26, which comprises an intermediate storage device connected to receive the data output from the memory device, said intermediate storage device outputting the data stored therein directly to the device requesting data.

31. The interface configuration according to claim 26, wherein said interface comprises an intermediate storage device connected to receive the data output from the memory device, and further components, said intermediate storage device outputting the data stored therein via said further components of said interface.

32. The interface configuration according to claim 31, wherein said further components include error correction logic subjecting the data output from the memory device to error correction.

33. The interface configuration according to claim 32, wherein said further components include a further intermediate storage device connected downstream of said error correction logic in a signal flow direction.

34. The interface configuration according to claim 26, wherein said interface is configured to output a signal to the device requesting data, the signal indicating that the data requested by the device can be transferred.

35. The interface configuration according to claim 26, wherein said interface, upon receiving a request from the device requesting data, compares an address transmitted to said interface with an address with which the last access to the memory device was initiated.

36. The interface configuration according to claim 35, wherein, when the compared addresses agree, said interface outputting the data obtained in response to a last access to the memory device to the device requesting data.

37. The interface configuration according to claim 36, wherein, when the compared addresses do not agree, said interface reading the data stored at the received address from the memory device and outputting the data to the device requesting data.

38. The interface configuration according to claim 37, wherein, when the compared addresses do not agree and an access to the memory device is currently being carried out, reading data not requested by the device requesting data, said interface interrupting the reading of the data.

39. The interface configuration according to claim 26, which comprises a third intermediate storage device, and wherein an amount of data that is greater than an amount of data requested by the device requesting data is read from the memory device, and at least parts of the data output from the memory device are stored in said third intermediate storage device.

40. The interface configuration according to claim 39, wherein said interface is configured to selectively output the data output from the memory device or the data stored in said third intermediate storage device or parts of the data to the device requesting data.

41. The interface configuration according to claim 39, wherein said interface includes an address storage device for storing in each case the address that was used to read the data stored in said third intermediate storage device from the memory device.

42. The interface configuration according to claim 41, wherein, upon receiving a request from the device requesting data, said interface compares the address transmitted with the request with the address stored in said address storage device.

43. The interface configuration according to claim 42, wherein, when the compared addresses agree, said interface outputting a part or all of the data stored in said third intermediate storage device to the device requesting data.

44. The interface configuration according to claim 42, wherein, when the compared addresses do not agree, said interface reading the data stored at the received address from the memory device and outputting the data to the device requesting data.

45. The interface configuration according to claim 39, wherein said interface is configured to output data stored in said third intermediate storage device to the device requesting data only when no data have been written to the memory device since a last reading of data stored in said third intermediate storage device.

46. The interface configuration according to claim 39, wherein said third intermediate storage device is configured to only store specific data.

47. The interface configuration according to claim 46, wherein said third intermediate storage device is configured to store only data not representing commands.

48. The interface configuration according to claim 46, wherein said third intermediate storage device is configured to store only data representing commands.

49. The interface configuration according to claim 48, wherein said interface is a constituent part of the memory device.

50. The interface configuration according to claim 48, wherein said interface is a constituent part of the device requesting data.

* * * * *